(12) United States Patent
Moser et al.

(10) Patent No.: US 11,021,574 B2
(45) Date of Patent: Jun. 1, 2021

(54) DUAL CURE MONOMERS

(71) Applicant: 3M INNOVATIVE PROPERTIES COMPANY, St. Paul, MN (US)

(72) Inventors: William H. Moser, Edina, MN (US); Erik M. Townsend, South St. Paul, MN (US); Ian Dailey, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/348,346

(22) PCT Filed: Nov. 21, 2017

(86) PCT No.: PCT/US2017/062753
§ 371 (c)(1),
(2) Date: May 8, 2019

(87) PCT Pub. No.: WO2018/102197
PCT Pub. Date: Jun. 7, 2018

(65) Prior Publication Data
US 2020/0062908 A1    Feb. 27, 2020

Related U.S. Application Data

(60) Provisional application No. 62/429,093, filed on Dec. 2, 2016.

(51) Int. Cl.
*C08G 75/045* (2016.01)
*C08G 75/12* (2016.01)
*C08G 59/22* (2006.01)

(52) U.S. Cl.
CPC .......... *C08G 75/045* (2013.01); *C08G 75/12* (2013.01); *C08G 59/22* (2013.01)

(58) Field of Classification Search
CPC ...... C08G 75/045; C08G 75/12; C08G 75/04; C08G 59/22
See application file for complete search history.

(56) References Cited

U.S. PATENT DOCUMENTS

| | | | |
|---|---|---|---|
| 3,018,262 A | 1/1962 | Schroeder | |
| 3,117,099 A | 1/1964 | Proops | |
| 3,165,514 A | 1/1965 | D'Alelio | |
| 3,661,744 A | 5/1972 | Kehr | |
| 3,859,255 A * | 1/1975 | Heer | C07D 303/24 528/87 |
| 4,220,513 A | 9/1980 | Green et al. | |
| 4,279,717 A | 7/1981 | Eckberg | |
| 4,284,574 A * | 8/1981 | Bagga | C07D 303/24 549/555 |
| 4,461,879 A | 7/1984 | Bauer | |
| 4,709,062 A * | 11/1987 | Tomita | C07D 303/22 549/553 |
| 5,154,762 A | 10/1992 | Mitra | |
| 5,389,533 A * | 2/1995 | von Gentzkow | C12N 11/08 435/176 |
| 5,501,727 A | 3/1996 | Wang | |
| 5,646,226 A * | 7/1997 | Sachinala | C07H 15/04 527/300 |
| 5,650,261 A | 7/1997 | Winkle | |
| 5,753,346 A | 5/1998 | Leir | |
| 9,012,020 B2 | 4/2015 | Wittenbecher | |
| 2003/0109609 A1* | 6/2003 | Lazzari | C07D 403/14 524/104 |
| 2012/0001217 A1 | 1/2012 | Kang | |
| 2012/0041102 A1* | 2/2012 | Chun | C08G 59/5033 523/456 |
| 2015/0051316 A1* | 2/2015 | Chun | C08G 59/22 523/425 |
| 2016/0036013 A1 | 2/2016 | Nakazato | |
| 2016/0297951 A1 | 10/2016 | Kumano | |

FOREIGN PATENT DOCUMENTS

| | | |
|---|---|---|
| EP | 0188880 | 5/1989 |
| EP | 2149572 A1 | 2/2010 |
| WO | WO 2009-010423 | 1/2009 |
| WO | WO 2016-168048 | 10/2016 |

OTHER PUBLICATIONS

Cameron, "Base catalysis in imaging materials. 1. Design and synthesis of novel light-sensitive urethanes as photoprecursors of amines", J. Org. Chem., 1990, vol. 55, pp. 5919-5922.
Cameron, "Photogeneration of organic bases from o-Nitrobenzyl-derived carbamates", J. Am. Chem. Soc., 1991, vol. 113, No. 11, pp. 4303-4313.
Cole, "Redox Initiation of Bulk Thiol-alkene Polymerizations", Polym. Chem., 2013, vol. 4, No. 4, pp. 1167-1175.
Shirai, "Photoacid and photobase generators: chemistry and applications to polymeric materials", Progress in Polymer Science, 1996, vol. 21, pp. 1-45.
Tachi, "Photochemical Reactions of Quatrnary Ammonium Dithiocarbamates as Photobase Generators and Their Use in the Photoinitiated Thermal Crosslinking of Poly(glycidylmethacrylate)", Journal of Polymer Science, Part A: Polymer Chemistry, 2001, vol. 39, pp. 1329-1341.
International Search report for PCT International Application No. PCT/US2017/062753 dated Mar. 8, 2018, 5 pages.

* cited by examiner

Primary Examiner — Shane Fang

(57) ABSTRACT

Provided are dual cure monomer are of the formula: (I) wherein $R^*$ is a (hetero)hydrocarbyl group; $X^1$ is —O—, —S—, —NR$^3$—, —NR$^3$—CO—NR$^3$, —CO—NR$^3$— or NR$^3$—CO—, where $R^3$ is H, $C_1$-$C_4$ alkyl or $R^1$-Epoxy; $R^1$ is a divalent (hetero)hydrocarbyl group; $X^2$ is —O—, —S—, —NR$^4$—, —NR$^4$—CO—NR$^4$—, —CO—NR$^4$—, —NR$^4$—CO— where $R^4$ is H, $C_1$-$C_4$ alkyl or $R^2$—CH=CH$_2$; $R^2$ is a divalent (hetero)hydrocarbyl group; subscripts a and b are at least one, subscripts c and d are at least one, with the proviso that the monomer has at least two epoxy groups and at least two ene groups.

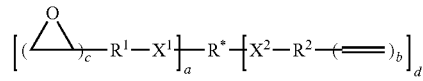

17 Claims, No Drawings

DUAL CURE MONOMERS

CROSS REFERENCE TO RELATED APPLICATIONS

This application is a national stage filing under 35 U.S.C. 371 of PCT/US2017/062753, filed Nov. 21, 2017, which claims the benefit of U.S. Provisional Application No. 62/429,093, filed Dec. 2, 2016, the disclosure of which is incorporated by reference in its/their entirety herein.

BACKGROUND

Polythioethers represent an important class of polymers which have been used in a variety of different industries. Both the methods of polymerization and the final properties of the polythioether network provide benefits for their application to coatings, sealants, microfluidic devices, optical lenses, dental materials, holographic diffractive materials, and others.

The thioether functionality is generated either through thermal thiol-epoxy reactions, or through radical thiol-ene reactions. In the case of thiol-epoxy reactions, the thiol and epoxy monomers are typically combined in the presence of a suitable base catalyst, which catalyzes nucleophilic attack of the thiol on epoxy groups. The rate of polymerization can be controlled to some degree by the strength and amount of the base added; however, complete cure can require long periods of time, and the ability to impact the rate of reaction once it has begun is limited. In contrast, the thiol-ene reaction is typically achieved photochemically by irradiating the components in the presence of a suitable radical-generating photoinitiator. Although this reaction occurs rapidly, it requires that the initiating light effectively penetrates all of the material that is desired to be cured, since the thiol-ene reaction will not proceed at an effective rate in the absence of the initiating radicals. The use of redox reactions to initiate thiol-ene reactions has been explored, although there have not been industrial applications of this strategy to date.

The use of polythioether-based materials has been limited to applications which required a long cure time prior to use (thiol-epoxy formulations) or applications in which effective photochemical curing could be ensured (thiol-ene formulations). However, there exists today many examples of applications in which a greater flexibility of curing regimens would be highly desirable. As one example, existing sealant products now in use by the aircraft industry include two-component products, in which mixing the first and second components starts a thiol-epoxy chemical reaction with the sealant forming an elastomeric solid over time. Although the relatively slow thiol-epoxy reaction is desirable to allow extended time to work with the sealant material, it also necessitates a waiting period following application in which the sealant must be allowed to cure to a durable polymer with tack-free surface. Aircraft manufacturers use a variety of methods to eliminate this waiting time, including the use of energy-intensive forced-air heaters, detackifier products which potentially disrupt adhesion of other materials or dissolve in fuel to generate particles that could clog filters and the erection of physical barriers such as tents to protect the uncured and tacky sealant. Thus there exists a need for an aircraft sealing material that can simultaneously satisfy the need of having a long application life but can also be cured on demand by the customer.

SUMMARY

This disclosure provides novel monomers containing both ene and epoxy functionality, which simultaneously provides access to both thiol-epoxy and thiol-ene polymer-forming reactions. As used herein "ene" is inclusive of alkenyl and alkynyl groups, and exclusive of (meth)acryloyl. Following mixing, a thiol-epoxy reaction provides a means to cure the formulation, with complete polymerization times from minutes to hours depending on the specific base catalyst used. The presence of the ene functionality also allows the formulation to be partially cured "on demand" in a matter of seconds by irradiation in the presence of appropriate photoinitiators that enable the thiol-ene reaction. Importantly, since the monomers contain both epoxy and ene functionalities, conversion of monomeric species in the formulation is high, regardless of whether the thiol-epoxy, thiol-ene, or a combination of the two reactions occurs. This disclosure provides novel monomers comprising both epoxy and ene groups.

This disclosure further provides a curable composition comprising the novel monomers and a polythiol component which cures the monomers by a combination of thiol-ene and thiol-epoxy reactions.

This disclosure further provides a method of curing by providing the curable composition, and free-radically curing the thiol and ene groups, then further curing the thiol-epoxy components, optionally in the presence of a base catalyst.

The novel dual-cure monomers are of the formula:

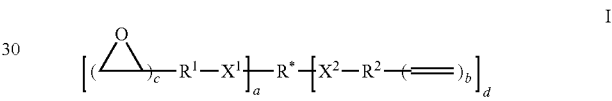

I wherein
R* is a (hetero)hydrocarbyl group;
$X^1$ is —O—, —S—, —NR$^3$—, —NR$^3$—CO—NR$^3$—, —CO—NR$^3$— or NR$^3$—CO—, where $R^3$ is H, $C_1$-$C_4$ alkyl or $R^1$-Epoxy;
$R^1$ is a (hetero)hydrocarbyl group;
$X^2$ is —O—, —S—, —NR$^4$—, —NR$^4$—CO—NR$^4$—, —CO—NR$^4$—, —NR$^4$—CO— where $R^4$ is H, $C_1$-$C_4$ alkyl or $R^2$—CH=CH2;
$R^2$ is a divalent (hetero)hydrocarbyl group;
subscripts a, b c and d are each independently at least one, with the proviso that the monomer has at least two epoxy groups and at least two ene groups. It will be understood that the alkenyl groups of Formula I may be substituted by alkynyl groups. R* does not include glycoluril.

"thiol-alkene-epoxy" refers to the reaction mixture of a polythiol and the dual-cure monomer having two or more ene groups, and two or more epoxy groups.

"Alkyl" means a linear or branched, cyclic or acylic, saturated monovalent hydrocarbon.

"Alkylene" means a linear or branched unsaturated divalent hydrocarbon.

"Alkenyl" means a linear or branched unsaturated hydrocarbon.

"Aryl" means a monovalent aromatic, such as phenyl, naphthyl and the like.

"Arylene" means a polyvalent, aromatic, such as phenylene, naphthalene, and the like.

"Aralkylene" means a group defined above with an aryl group attached to the alkylene, e.g., benzyl, 1-naphthylethyl, and the like.

As used herein, "(hetero)hydrocarbyl" is inclusive of hydrocarbyl alkyl and aryl groups, and heterohydrocarbyl heteroalkyl and heteroaryl groups, the later comprising one or more catenary (in-chain) heteroatoms such as ether or amino groups. Heterohydrocarbyl may optionally contain one or more catenary (in-chain) functional groups including ester, amide, urea, urethane, and carbonate functional groups. Unless otherwise indicated, the non-polymeric (hetero)hydrocarbyl groups typically contain from 1 to 60 carbon atoms. Some examples of such heterohydrocarbyls as used herein include, but are not limited to, methoxy, ethoxy, propoxy, 4-diphenylaminobutyl, 2-(2'-phenoxyethoxy)ethyl, 3,6-dioxaheptyl, 3,6-dioxahexyl-6-phenyl, in addition to those described for "alkyl", "heteroalkyl", and "aryl" supra.

DETAILED DESCRIPTION

This disclosure provides novel dual-cure monomers of Formula I supra, and curable compositions comprising the monomers and one or more polythiol compounds. In some embodiments, R* may be a cyclic or acyclic aliphatic group, optionally containing one or more of esters, amides, ethers, thioethers, urethanes, and urea functional groups. In another embodiment, R* is an cyclic (hetero)aromatic group. In another embodiment, R* is the residue of a polyol. In another embodiment, R* is the residue of an isocyanurate.

Generally, the dual-functional monomers may be prepared by sequential functionalization of a compound having an R* residue and a plurality of nucleophilic functional groups, particularly hydroxy or amine functional groups, i.e. a polyol or polyamine. The polyfunctional R* compound is reacted sequentially with an unsaturated compound to provide the ene group and an epoxy compound. The functionalization may be in any order, and is controlled by restricting the stoichiometry of the functionalizing reactants:

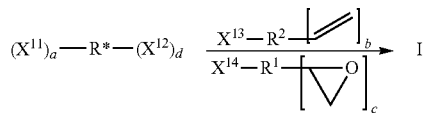

where
$X^{11}$ and $X^{12}$ are independently SH, —OH or —NR$^{13}$H, where $R^{13}$ is H, $C_1$-$C_4$ alkyl;
R* is a (hetero)hydrocarbyl group;
$X^{13}$ and $X^{14}$ are leaving groups including halide, tosylate, triflate, acetoxy, or electrophilic functional groups such as isocyanate, ester, acyl halide or anhydride,
$R^1$ and $R^2$ are (hetero)hydrocarbyl groups; and
subscripts a, b, c and d are at least one.

For example, the dual functional monomers may be prepared by alkylation of a polyol (or polyamine) with an α-halo ω-olefin, such as an allyl halide to provide the ene groups and alkylation by a glycidyl compound to provide the epoxy groups. Alternatively, the ene groups may be provided by reaction of a polyol with a compound having an isocyanate groups and a terminal alkene group, and reaction of the remaining hydroxy groups of the polyol with an isocyanate compound having epoxy groups.

Useful starting R* compounds having nucleophilic X groups include polyols, polyamines.

In some embodiments, the starting polyol or polyamine is of the formula:

 $R^{10}(X^{15})_e$,    II where $R^{10}$ is a (hetero)hydrocarbyl group including aliphatic, heteroaliphatic, and aromatic groups, and $X^{15}$ is —OH or —NR$^{13}$H, where $R^{13}$ is H, $C_1$-$C_4$ alkyl, and subscript e is at least two. In some preferred embodiments, $R^{10}$ may be derived form a poly(alkyleneamines). In other preferred embodiments, $R^{10}$ is a hydrocarbyl aliphatic or aromatic group, including $C_2$-$C_{10}$ alkylene.

Polyols useful in the preparation of the dual-functional monomer include aliphatic, cycloaliphatic, aryl or alkanol-substituted aryl polyols, or mixtures thereof having from about 2 to 18 carbon atoms and two to five, preferably two to four hydroxyl groups.

Examples of useful polyols include 1,2-ethanediol, 1,2-propanediol, 1,3-propanediol, 1,4-butanediol, 1,3-butanediol, 2-methyl-1,3-propanediol, 2,2-dimethyl-1,3-propanediol, 2-ethyl-1,6-hexanediol, 1,5-pentanediol, 1,6-hexanediol, 1,8-octanediol, neopentyl glycol, glycerol, trimethylolpropane, 1,2,6-hexanetriol, trimethylolethane, pentaerythritol, quinitol, mannitol, sorbitol, diethlene glycol, triethylene glycol, tetraethylene glycol, 2-ethyl-2-(hydroxymethyl)-1,3-propanediol, 2-ethyl-1,3-pentanediol, 1,4-cyclohexanedimethanol, 1,4-benzenedimethanol, dipentaertithritol, tripentaertithritol, bis(2-hydroxyethyl)aminotris(hydroxymethyl)methane and polyalkoxylated bisphenol A derivatives.

Useful polyamines include, for example, polyamines having at least two amino groups, wherein the two amino groups are primary, secondary, or a combination thereof. Examples include 1,10-diaminodecane, 1,12-diaminododecane, 9,9-bis(3-aminopropyl)fluorene, 2-(4-aminophenyl)ethylamine, 1,4-butanediol bis(3-aminopropyl) ether, $N(CH_2CH_2NH_2)_3$, 1,8-diamino-p-menthane, 4,4'-diaminodicyclohexylmethane, 1,3-bis(3-aminopropyl)tetramethyldisiloxane, 1,8-diamino-3,6-dioxaoctane, 1,3-bis(aminomethyl)cyclohexane, and polymeric polyamines such as linear or branched (including dendrimers) homopolymers and copolymers of ethyleneimine (that is, aziridine), and the like.

In some embodiments, preferred polyamines include those of the formula:

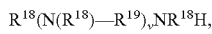 $R^{18}(N(R^{18})—R^{19})_v NR^{18}H$,    III wherein
each $R^{18}$ represents H, an alkyl group having from 1 to 4 carbon atoms, or an aryl group having from 6 to 10 carbon atoms; and
each $R^{19}$ independently represents an alkylene group having from 2 to 8 carbon atoms; and v is greater than 2, wherein the number of primary and secondary amino groups in the composition is at least 3. It is preferred that at least one of the terminal amine groups are primary amine groups due to the greater reactivity toward the functionalizing compounds.

Examples of useful polyamines include polyamines having at least three amino groups, wherein the three amino groups are primary, secondary, or a combination thereof include $H_2N(CH_2CH_2NH)_2H$, $H_2N(CH_2CH_2NH)_3H$, $H_2N(CH_2CH_2NH)_4H$, $H_2N(CH_2CH_2NH)_5H$, $H_2N(CH_2CH_2CH_2NH)_2H$, $H_2N(CH_2CH_2CH_2NH)_3H$, $H_2N(CH_2CH_2CH_2CH_2NH)_2H$, $H_2N(CH_2CH_2CH_2CH_2CH_2CH_2NH)_2H$, $H_2N(CH_2)_4NH(CH_2)_3NH_2$, $H_2N(CH_2)_3NH(CH_2)_4NH(CH_2)_3NH_2$, $H_2N(CH_2)_3NH(CH_2)_2NH(CH_2)_3NH_2$, $H_2N(CH_2)_2NH(CH_2)_3NH(CH_2)_2NH_2$, $H_2N(CH_2)_3NH(CH_2)_2NH_2$, $C_6H_5NH(CH_2)_2NH(CH_2)_2NH_2$, and $N(CH_2CH_2NH_2)_3$, and polymeric polyamines such as linear or branched (including dendrimers) homopolymers and copolymers of ethyleneimine (i.e., aziridine). Many such compounds can be obtained, or are available, from general chemical suppliers such as, for example, Aldrich Chemical Company, Milwaukee, Wis. or Pfaltz and Bauer, Inc., Waterbury, Conn. It will be understood with respect to the above polyamines, that both the terminal and catenary amines may undergo functionalization with ene and epoxy groups.

In an alternate embodiment, the starting R* compounds may have leaving groups or electrophilic functional groups, and the reactive functionalizing compounds have nucleophilic functional groups:

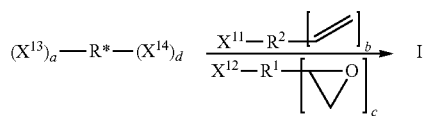

Useful starting R* compounds having X leaving groups or electrophilic functional groups including ester, acid halide, anhydride or isocyanate. Useful R* compounds include cyanuric chloride, and polyisocyanate compounds.

In some preferred embodiments, the dual cure monomer is derived from cyanuric chloride to produce dual-cure monomers of the formula:

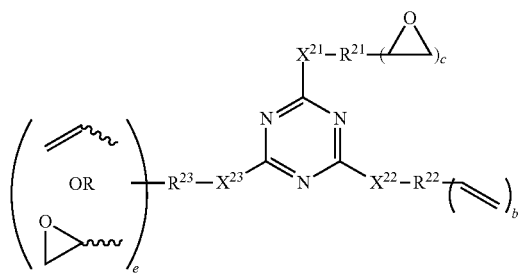

wherein
$R^{21}$ is a (hetero)hydrocarbyl group;
$R^{22}$ is a (hetero)hydrocarbyl group;
$R^{23}$ is a (hetero)hydrocarbyl group;
$X^{21}$, $X^{22}$ and $X^{23}$ are each independently —O— or —$NR^{13}$—, where $R^{13}$ is H, $C_1$-$C_4$ or $R^{22}$—CH=$CH_2$,
subscripts b and c and e are at least one,
with the proviso that the monomer has at least two epoxy groups and at least two ene groups.

Polyisocyanate compounds useful in preparing the monomers comprise isocyanate functional groups attached to the multivalent organic group (R*) that can comprise a (hetero) hydrocarbyl group including multivalent aliphatic, alicyclic, or aromatic moiety; or a multivalent aliphatic, alicyclic or aromatic moiety attached to a biuret, an isocyanurate, or a uretdione, or mixtures thereof. Preferred polyfunctional isocyanate compounds contain an average of at least two isocyanate (—NCO) functional groups. Compounds containing at least two —NCO groups are preferably comprised of di- or trivalent aliphatic, alicyclic, araliphatic, or aromatic groups to which the —NCO groups are attached.

Representative examples of suitable polyisocyanate compounds include isocyanate functional derivatives of the polyisocyanate compounds as defined herein. Examples of derivatives include, but are not limited to, those selected from the group consisting of ureas, biurets, allophanates, dimers and trimers (such as uretdiones and isocyanurates) of isocyanate compounds, and mixtures thereof. Any suitable organic polyisocyanate, such as an aliphatic, alicyclic, araliphatic, or aromatic polyisocyanate, may be used either singly or in mixtures of two or more.

Suitable aromatic polyisocyanate compounds include, but are not limited to, those selected from the group consisting of 2,4-toluene diisocyanate (TDI), 2,6-toluene diisocyanate, an adduct of TDI with trimethylolpropane (available as Desmodur™ CB from Bayer Corporation, Pittsburgh, Pa.), the isocyanurate trimer of TDI (available as Desmodur™ IL from Bayer Corporation, Pittsburgh, Pa.), diphenylmethane 4,4'-diisocyanate (MDI), diphenylmethane 2,4'-diisocyanate, 1,5-diisocyanato-naphthalene, 1,4-phenylene diisocyanate, 1,3-phenylene diisocyanate, 1-methyoxy-2,4-phenylene diisocyanate, 1-chlorophenyl-2,4-diisocyanate, and mixtures thereof.

Examples of useful alicyclic polyisocyanate compounds include, but are not limited to, those selected from the group consisting of dicyclohexylmethane diisocyanate ($H_{12}$ MDI, commercially available as Desmodur™ W available from Bayer Corporation, Pittsburgh, Pa.), 4,4'-isopropyl-bis(cyclohexylisocyanate), isophorone diisocyanate (IPDI), cyclobutane-1,3-diisocyanate, cyclohexane 1,3-diisocyanate, cyclohexane 1,4-diisocyanate (CHDI), 1,4-cyclohexanebis(methylene isocyanate) (BDI), dimer acid diisocyanate (available from Bayer), 1,3-bis(isocyanatomethyl)cyclohexane ($H_6$ XDI), 3-isocyanatomethyl-3,5,5-trimethylcyclohexyl isocyanate, and mixtures thereof.

Examples of useful aliphatic polyisocyanate compounds include, but are not limited to, those selected from the group consisting of tetramethylene 1,4-diisocyanate, hexamethylene 1,4-diisocyanate, hexamethylene 1,6-diisocyanate (HDI), octamethylene 1,8-diisocyanate, 1,12-diisocyanatododecane, 2,2,4-trimethyl-hexamethylene diisocyanate (TMDI), 2-methyl-1,5-pentamethylene diisocyanate, dimer diisocyanate, the urea of hexamethylene diisocyanate, the biuret of hexamethylene 1,6-diisocyanate (HDI) (Desmodur™ N-100 and N-3200 from Bayer Corporation, Pittsburgh, Pa.), the isocyanurate of HDI (available as Desmodur™ N-3300 and Desmodur™ N-3600 from Bayer Corporation, Pittsburgh, Pa.), a blend of the isocyanurate of HDI and the uretdione of HDI (available as Desmodur™ N-3400 available from Bayer Corporation, Pittsburgh, Pa.), and mixtures thereof.

Examples of useful araliphatic polyisocyanates include, but are not limited to, those selected from the group consisting of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, p-(1-isocyanatoethyl)phenyl isocyanate, m-(3-isocyanatobutyl)phenyl isocyanate, 4-(2-isocyanatocyclohexyl-methyl) phenyl isocyanate, and mixtures thereof.

Preferred polyisocyanates, in general, include those selected from the group consisting of tetramethylene 1,4-diisocyanate, hexamethylene 1,4-diisocyanate, hexamethylene 1,6-diisocyanate (HDI), octamethylene 1,8-diisocyanate, 1,12-diisocyanatododecane, the biuret of hexamethylene 1,6-diisocyanate (HDI) (Desmodur™ N-100 and N-3200 from Bayer Corporation, Pittsburgh, Pa.), the isocyanurate of HDI (available as Desmodur™ N-3300 and Desmodur™ N-3600 from Bayer Corporation, Pittsburgh, Pa.), a blend of the isocyanurate of HDI and the uretdione of HDI (available as Desmodur™ N-3400 available from Bayer Corporation, Pittsburgh, Pa.), and the like, and mixtures thereof.

The curable composition comprises a dual-functional monomer of Formula I and a polythiol compound. The polythiol reactant in the thiol-alkene-epoxy resin is of the formula:

$$R^{30}(SH)_y, \qquad \text{IV}$$

where $R^{30}$ is (hetero)hydrocarbyl group having a valence of y, and y is ≥2, preferably >2. The thiol groups of the polythiols may be primary or secondary. The compounds of Formula II may include a mixture of compounds having an average functionality of two or greater.

$R^{30}$ includes any (hetero)hydrocarbyl groups, including aliphatic and aromatic polythiols. $R^{30}$ may optionally further include one or more functional groups including pendent hydroxyl, acid, ester, or cyano groups or catenary (in-chain) ether, urea, urethane and ester groups.

In one embodiment, $R^{30}$ comprises a non-polymeric aliphatic or cycloaliphatic moiety having from 1 to 30 carbon atoms. In another embodiment, $R^{30}$ is polymeric and comprises a polyoxyalkylene, polyester, polyolefin, polyacrylate, or polysiloxane polymer having pendent or terminal reactive —SH groups. Useful polymers include, for example, thiol-terminated polyethylenes or polypropylenes, and thiol-terminated poly(alkylene oxides).

Specific examples of useful polythiols include 2,3-dimercapto-1-propanol, 2-mercaptoethyl ether, 2-mercaptoethyl sulfide, 1,6-hexanedithiol, 1,8-octanedithiol, 1,8-dimercapto-3,6-dithiaoctane, propane-1,2,3-trithiol, and trithiocyanuric acid.

Another useful class of polythiols includes those obtained by esterification of a polyol with a terminally thiol-substituted carboxylic acid (or derivative thereof, such as esters or acyl halides) including α- or β-mercaptocarboxylic acids such as thioglycolic acid, β-mercaptopropionic acid, 2-mercaptobutyric acid, or esters thereof.

Useful examples of commercially available compounds thus obtained include ethylene glycol bis(thioglycolate), pentaerythritol tetrakis(3-mercaptopropionate), dipentaerythritol hexakis(3-mercaptopropionate), ethylene glycol bis(3-mercaptopropionate), trimethylolpropane tris(thioglycolate), trimethylolpropane tris(3-mercaptopropionate), pentaerythritol tetrakis(thioglycolate), pentaerythritol tetrakis(3-mercaptopropionate), pentaerithrytol tetrakis (3-mercaptobutylate), and 1,4-bis 3-mercaptobutylyloxy butane, tris[2-(3-mercaptopropionyloxy)ethyl]isocyanurate, trimethylolpropane tris(mercaptoacetate), 2,4-bis(mercaptomethyl)-1,3,5,-triazine-2,4-dithiol, 2,3-di(2-mercaptoethyl)thio)-1-propanethiol, dimercaptodiethylsulfide, and ethoxylated trimethylpropane-tri(3-mercaptopropionate).

A specific example of a polymeric polythiol is polypropylene ether glycol bis(3-mercaptopropionate) which is prepared by esterification of polypropylene-ether glycol (e.g., Pluracol™ P201, BASF Wyandotte Chemical Corp.) and 3-mercaptopropionic acid by esterification.

Useful soluble, high molecular weight thiols include polyethylene glycol di(2-mercaptoacetate), LP-3™ resins supplied by Morton Thiokol Inc. (Trenton, N.J.), and Permapol P3™ resins supplied by Products Research & Chemical Corp. (Glendale, Calif.) and compounds such as the adduct of 2-mercaptoethylamine and caprolactam.

Preferred polythiols include the following:

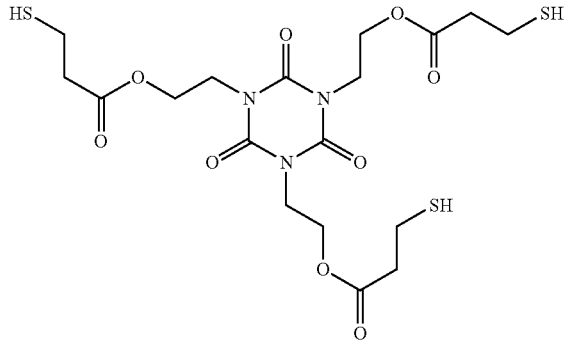

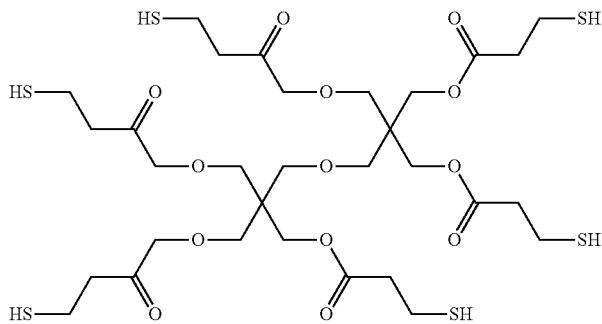

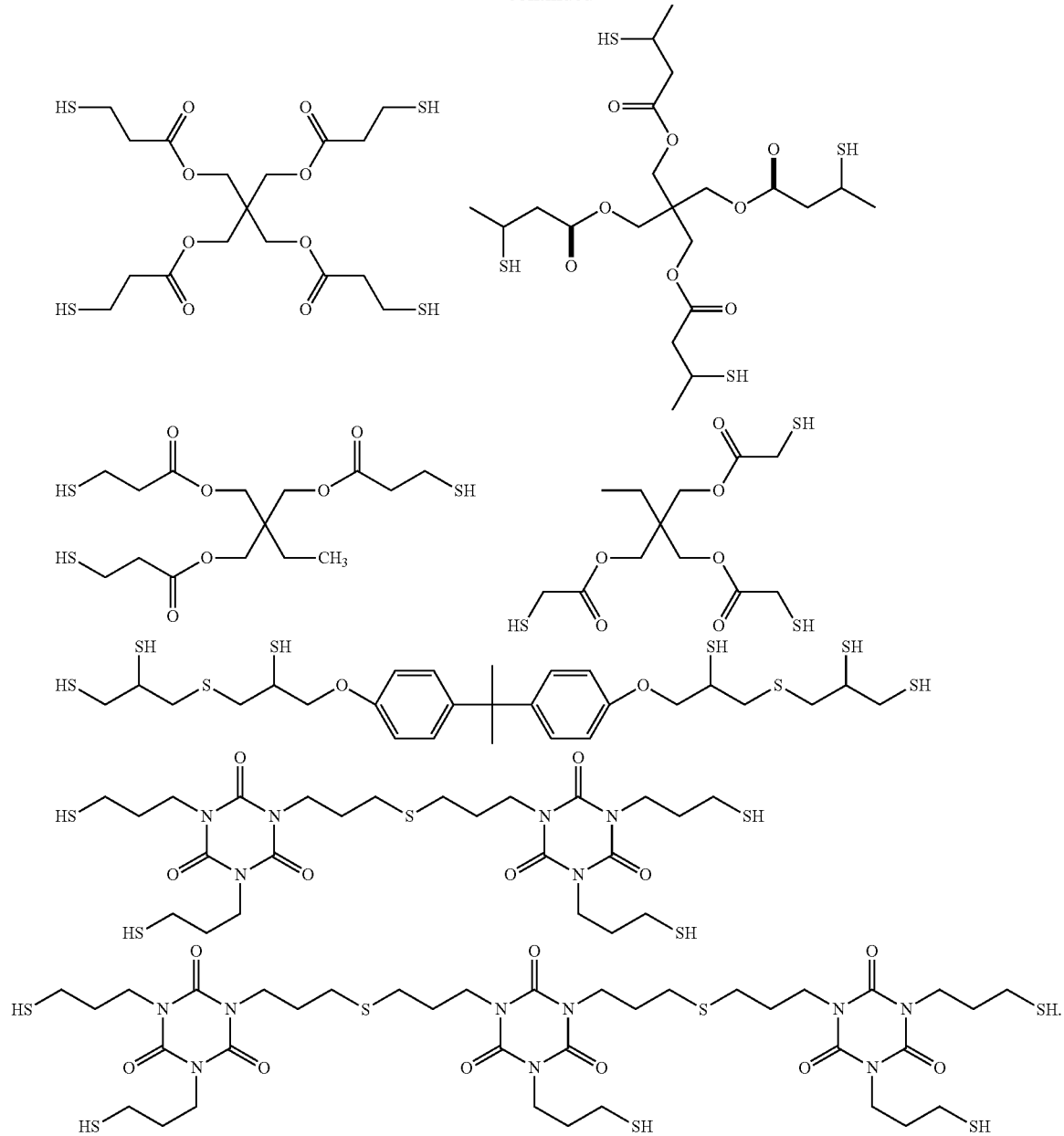

The epoxy and thiol component is thermally cured using a base catalyst. The catalyst may be a photocatalyst, including photoacid or photobase generators. Tertiary amines are among the preferred base catalysts. The curing can be controlled by different kind of catalysts, the amount of catalyst as well as the curing temperature.

The amine catalyst is used for the deprotonation of thiol (—SH) to thiolate (—S⁻) which reacts with epoxy group by nucleophilic ring opening polymerization. An amine catalyst can include one or more from the group: a cyclic amidine; a tertiary amine; a secondary amine; a substituted cyclic amidine, substituted tertiary amine, substituted secondary amine; or a combination thereof. The catalyst can comprise one or more of imidazole, imidazoline, pyrrolidine, a substituted imidazole compound, a substituted imidazoline compound, 1,4,5,6-tetrahydropyrimidine, a substituted 1,4,5,6-tetrahydropyrimidine compound, a substituted pyrrolidine compound, a substituted piperidine compound, and combinations thereof. The catalyst can also comprise an unsubstituted piperidine, an acyclic amidine or a substituted acyclic amidine. Examples of acyclic amidines that may be acceptable catalysts according to the present invention include N,N'-dialkylalkylamidines, such as N,N'-dimethylalkylamidine, and N,N'-diethylmethylamidine and tetraalkyl guanidine compounds, such as those described in U.S. Pat. No. 9,012,020 (Wittenbecher et al.)

A polyfunctional or multifunctional amine (e.g., a diamine containing both primary and secondary functionality and multiple primary functionality) will cause chain extension and crosslinking (i.e., will function as a curing agent). Even though it will cause crosslinking to occur, a polyfunctional amine or other curing agent may be used, but in a limited amount.

The amine catalyst for the epoxy resin may be a photobase generator. On exposure to UV radiation, the photobase generator releases an amine, which catalyzes the addition of the thiol to the epoxy.

Photobase generators useful in the present invention are any compounds which liberate base upon exposure to light, typically at a wavelength of about 320 to 420 nanometers, however other wavelengths may be suitable. Suitable photobase generators include, but are not limited to: benzyl carbamates, benzoin carbamates, o-carbamoylhydroxyamines, o-carbamoyloximes, aromatic sulfonamides, alpha-lactams, N-(2-allylethenyl)amides, arylazide compounds, N-arylformamides, alkylamidines like 1,5-diazabicyclo[4.3.0]non-5-ene (DBN), 1,8-diazabicyclo[5.4.0]undec-7-ene (DBU) and 4-(ortho-nitrophenyl) dihydropyridines.

The photobase generator is not specifically limited so long as it generates an amine directly or indirectly with light irradiation. The photobase generator includes for example bis[[(2-nitrobenzyl)oxy]carbonylhexane-1,6-diamine], nitrobenzyl cyclohexyl carbamate, di(methoxybenzyl) hexamethylene dicarbamate and the compounds of the general formula:
$(R^5-NR^6)_x-R^7$, where $R^5$ is a photoactive group including benzyloxy groups and formal groups, $R^6$ is a hydrogen or alkyl group, $R^7$ is polyvalent alkyl or aryl group, and x is at least 1. It will be understood that the formula represents an amine photobase generator wherein the polyamine liberated by photolysis is of the formula $(HNR^6)_x-R^7$.

Preparation of photobase generator compounds is known in the art. See J. Cameron et al., J. Am. Chem. Soc., vol. 113, no. 11, 4303-4313 (1991); J. Cameron et al., J. Polym. Mater. Sci. Eng., 64, 55 (1991); and J. Cameron, et al., J. Org. Chem., 55, 5919-5922 (1990), and U.S. Pat. No. 5,650,261 (Winkel), incorporated herein by reference.

Photobase generators are further described in M. Shirai et al. *Photochemical Reactions of Quatrnary Ammonium Dithiocarbamates as Photobase Generators and Their Use in The Photoinitiated Thermal Crosslinking of Poly(glycidyl-methacrylate)*, Journal of Polymer Science, Part A: Polymer Chemistry, vol. 39, pp. 1329-1341 (2001) and M. Shirai et al., "Photoacid and photobase generators: chemistry and applications to polymeric materials", Progress in Polymer Science, vol. 21, pp. 1-45, XP-002299394, 1996.

The use of a photobase generator may produce residue products from the photochemical production of base. Upon exposure to actinic radiation, the photobase generator will photolyze yielding an amine and a residue compound. For example, a bis-benzyl carbamate of a diamine will photolyze to yield the diamine and a phenyl ketone as the "residue of a photobase generator". Oxime esters will yield ketones. Such residues are present in small amounts and do not normally interfere with the desired properties of the cured composition. The residues may be detected by conventional analytical techniques, such as infrared, ultraviolet and NMR spectroscopy, gas or liquid chromatography, mass spectroscopy, or a combination of such techniques. Thus, the present invention may comprise cured thiol-epoxy-ene matrix copolymer and detectable amounts of residues from a photobase/acid generator.

Generally the catalyst for the epoxy-thiol reaction is used in amounts of at least about 0.05 wt-%, more preferably at least about 0.1 wt-%, in the range of from about 0.1 wt-% to about 5 wt-% or, more preferably, in the range of from about 0.5 wt-% to about 2 wt-%, based on the total amount of the epoxy groups and the molecular weight of the catalyst.

The thiol and ene groups of the composition may be cured by exposure to actinic radiation such as UV light. The composition may be exposed to any form of actinic radiation, such as visible light or UV radiation, but is preferably exposed to UVA (320 to 390 nm) or UVV (395 to 445 nm) radiation. Generally, the amount of actinic radiation should be sufficient to form a solid mass that is not sticky to the touch. Generally, the amount of energy required for curing the compositions of the invention ranges from about 0.2 to 20.0 $J/cm^2$.

To initiate photopolymerization, the composition is placed under a source of actinic radiation such as a high-energy ultraviolet source having a duration and intensity of such exposure to provide for essentially complete (greater than 80%) polymerization of the composition. If desired, filters may be employed to exclude wavelengths that may deleteriously affect the reactive components or the photopolymerization.

Photopolymerization may be effected via an exposed surface of the curable composition, or through the barrier layers as described herein by appropriate selection of a barrier film having the requisite transmission at the wavelengths necessary to effect polymerization.

Photoinitiation energy sources emit actinic radiation, i.e., radiation having a wavelength of 700 nanometers or less which is capable of producing, either directly or indirectly, free radicals capable of initiating polymerization of the thiol-alkene compositions. Preferred photoinitiation energy sources emit ultraviolet radiation, i.e., radiation having a wavelength between about 180 and 460 nanometers, including photoinitiation energy sources such as mercury arc lights, carbon arc lights, low, medium, or high pressure mercury vapor lamps, swirl-flow plasma arc lamps, xenon flash lamps ultraviolet light emitting diodes, and ultraviolet light emitting lasers.

In one embodiment, the initiator is a photoinitiator and is capable of being activated by UV radiation. Useful photoinitiators include e.g., benzoin ethers such as benzoin methyl ether and benzoin isopropyl ether, substituted benzoin ethers, substituted acetophenones such as 2,2-dimethoxy-2-phenylacetophenone, and substituted alpha-ketols. Examples of commercially available photoinitiators include Irgacure™ 819 and Darocur™ 1173 (both available form Ciba-Geigy Corp., Hawthorne, N.Y.), Lucem TPO™ (available from BASF, Parsippany, N.J.) and Irgacure™ 651, 2,2-dimethoxy-2-phenylacetophenone which is available from Acros Organics. Preferred photoinitiators are ethyl 2,4,6-trimethylbenzoylphenyl phosphinate (Lucirin™ TPO-L) available from BASF, Mt. Olive, N.J., and 2-hydroxy-2-methyl-1-phenyl-propan-1-one (IRGACURE 1173™, Ciba Specialties), Other suitable photoinitiators include mercaptobenzothiazoles, mercaptobenzooxazoles and hexaaryl bisimidazole.

The thiol and ene components may also be polymerized using a redox initiator system of an oxidizing agent and a reducing agent. Reference may be made to Bowman et al., Redox Initiation of Bulk Thiol-alkene Polymerizations, Polym. Chem., 2013, 4, 1167-1175, and references therein.

The reducing and oxidizing agents react with or otherwise cooperate with one another to produce free radicals capable of initiating polymerization of the thiol and ene components. This type of cure is a dark reaction, that is, it is not dependent on the presence of light and can proceed in the absence of light. The reducing and oxidizing agents are preferably sufficiently shelf-stable and free of undesirable colorization to permit their storage and use under typical conditions.

Useful reducing agents include ascorbic acid, ascorbic acid derivatives, and metal complexed ascorbic acid compounds as described in U.S. Pat. No. 5,501,727 (Wang et al.); amines, especially tertiary amines, such as 4-tert-butyl dimethylaniline; aromatic sulfinic salts, such as p-toluene-sulfinic salts and benzenesulfinic salts; thioureas, such as 1-ethyl-2-thiourea, tetraethyl thiourea, tetramethyl thiourea, 1,1-dibutyl thiourea, and 1,3-dibutyl thiourea; and mixtures thereof. Other secondary reducing agents may include cobalt (II) chloride, ferrous chloride, ferrous sulfate, hydrazine, hydroxylamine (depending on the choice of oxidizing agent), salts of a dithionite or sulfite anion, and mixtures thereof. Preferably, the reducing agent is an amine.

Suitable oxidizing agents will also be familiar to those skilled in the art, and include but are not limited to persulfuric acid and salts thereof, such as sodium, potassium, ammonium, cesium, and alkyl ammonium salts. Additional oxidizing agents include peroxides such as benzoyl peroxides, hydroperoxides such as cumyl hydroperoxide, t-butyl hydroperoxide, and amyl hydroperoxide, as well as salts of transition metals such as cobalt (III) chloride and ferric chloride, cerium (IV) sulfate, perboric acid and salts thereof, permanganic acid and salts thereof, perphosphoric acid and salts thereof, and mixtures thereof.

It may be desirable to use more than one oxidizing agent or more than one reducing agent. Small quantities of transition metal compounds may also be added to accelerate the rate of redox cure. The reducing or oxidizing agents can be microencapsulated as described in U.S. Pat. No. 5,154,762 (Mitra et al.). This will generally enhance shelf stability of the polymerizable composition, and if necessary permit packaging the reducing and oxidizing agents together.

Generally, the amount of initiator is less than 5 wt. %, preferably less than 2 wt. %. In some embodiments, there is no added free radical initiator for the thiol-ene reaction. In some embodiments there is no base catalyst for the thiol-epoxy reaction.

In some embodiments, the photoinitiator and photobase generator are chosen to be sensitive to different wavelengths. That is the photoinitiator may be chosen to be sensitive to radiation from the first actinic light source; and the photobase generator may be sensitive to radiation from a second actinic light source different from the first actinic light source.

The curable composition optionally includes a multifunctional (meth)acrylate preferably containing an average of two or more free-radically polymerizable groups. A diluent having three or more of such reactive groups can be present as well. Examples of such monomers include: $C_2$-$C_{18}$ alkylenedioldi(meth)acrylates, $C_3$-$C_{18}$ alkylenetriolitri(meth)acrylates, the polyether analogues thereof, and the like, such as 1,6-hexanedioldi(meth)acrylate, trimethylolpropanetri(meth)acrylate, triethyleneglycoldi(meth)acrylate, pentaerithritoltri(meth)acrylate, and tripropyleneglycol di(meth)acrylate, and di-trimethylolpropane tetraacrylate. Generally such multifunctional acrylates are used in about of 10 parts by weight or less, relative to 100 parts by weight of the curable composition.

The curable composition may optionally include a polyene compound. Examples of suitable polyene compounds are trimethylolpropanetriallylether, tetrallylpentaerythritol, Santolink XI-100 (Monsanto), tetraallyloxyethane, 1,3,5-benzoltricarbonic acid triallyl ester, 1,2,4-benzoltricarbonic acid triallylester, 1,2,4,5-benzoltetracarbonic acid tetrallylester, triallyl phosphate, triallyl citrate, triallyl isocyanurate, triallyloxytriazine, hexallylinosite, as well as in general compounds which possess at least two ethylenically unsaturated groups which can be optionally substituted, for example O-allyl, N-allyl, O-vinyl, N-vinyl, p-vinylphenolether groups. Possible polyenes are also described in U.S. Pat. No. 3,661,744 and EP-A-0 188 880. The allyl and/or vinyl esters of the at least difunctional carbonic acids are for example very suitable polyene compounds. Suitable carbonic acids for this are those with carbon chains of 2 to 20 C atoms, preferably 5 to 15 C atoms. Allyl or vinyl esters of aromatic dicarbonic acids such as phthalic acid or trimellitic acid are also very suitable. Allyl ethers of polyfunctional alcohols, preferably at least trifunctional alcohols are also suitable. Allyl ethers of trimethyl propane, pentaerithritol triallyl ether or 2,2-bis-oxyphenylpropane-bis-(diallyl phosphate) can be named as examples. Compounds of the cyanuric acid triallylester, triallyl triazinetrione type and similar are also suitable.

The curable composition may optionally include an epoxy resin. Suitable epoxy resins include monomeric or oligomeric epoxy compounds that can be aliphatic, alicyclic, aromatic, or heterocyclic. These materials generally have, on the average, ≥1 polymerizable epoxy group per molecule. Preferably the epoxy resins have ≥1.5 or 2 polymerizable epoxy groups per molecule. The oligomeric epoxides can be linear oligomers having terminal epoxy groups (for example, a diglycidyl ether of a polyoxyalkylene glycol), oligomers having skeletal epoxy units (for example, polybutadiene polyepoxide), or oligomers having pendant epoxy groups (for example, a glycidyl methacrylate oligomer or co-oligomer). The epoxides can be pure compounds or can be mixtures of compounds containing one, two, or more epoxy groups per molecule.

These epoxy-containing materials can have a backbone of any type and with any suitable substituent group thereon that does not substantially interfere with cure. Illustrative of permissible substituent groups include halogens, ester groups, ethers, sulfonate groups, siloxane groups, nitro groups, phosphate groups, and the like. The average molecular weight of the epoxy-containing materials can vary from about 58 g/mole to about 1000 g/mole or more.

Exemplary epoxides are glycidyl ethers of polyhydric phenols that can be obtained by reacting a polyhydric phenol with an excess of a chlorohydrin such as epichlorohydrin (for example, the diglycidyl ether of 2,2-bis-(2,3-epoxypropoxyphenol)-propane).

Additional examples of epoxides of this type are described in U.S. Pat. No. 3,018,262, and in Handbook of Epoxy Resins, Lee and Neville, McGraw-Hill Book Co., New York (1967).

Numerous commercially available epoxy resins can be utilized. In particular, epoxides that are readily available include resins of octadecylene oxide, epichlorohydrin, styrene oxide, vinyl cyclohexene oxide, glycidol, glycidyl methacrylate, diglycidyl ethers of Bisphenol A (for example, EPON 828, EPON 825, EPON 1004, and EPON 1001 from Momentive Specialty Chemicals) as well as DER 221, DER 332, and DER 334 from Dow Chemical Co., Midland, Mich.), vinylcyclohexene dioxide (for example, ERL 4206 from Union Carbide), 3,4-epoxycyclohexylmethyl-3,4-epoxycyclohexene carboxylate (for example, ERL 4221, CYRACURE UVR 6110, and CYRACURE UVR 6105 from Union Carbide), 3,4-epoxy-6-methylcyclohexylmethyl-3,4-epoxy-6-methyl-cyclohexene carboxylate (for example, ERL 4201 from Union Carbide), bis(3,4-epoxy-6-methylcyclohexylmethyl) adipate (for example, ERL 4289), bis(2,3-epoxycyclopentyl) ether (for example, ERL 0400), aliphatic epoxy modified from polypropylene glycol (for example, ERL 4050 and ERL 4052), dipentene dioxide (for example, ERL 4269), epoxidized polybutadiene (for example, OXIRON 2001 from FMC Corp.), silicone resin containing epoxy functionality, flame-retardant epoxy resins such as brominated bisphenol-type epoxy resins (for example, DER 580), 1,4-butanediol diglycidyl ether of phenol formaldehyde Novolac (for example, DEN 431 and DEN 438 from Dow Chemical), resorcinol diglycidyl ether (for example, KOPDXITE from Koppers Company, Inc.), bis(3,4-epoxycyclohexylmethyl)adipate (for example, ERL 4299 or CYRACURE UVR 6128), 2-(3,4-epoxycyclohexyl-5,5-spiro-3,4-epoxy) cyclohexane-meta-dioxane (for example, ERL-4234), vinylcyclohexene monoxide, 1,2-epoxyhexadecane (for example, CYRACURE UVR-6216), alkyl glycidyl ethers such as alkyl Cs—C 10 glycidyl ether (for example, HELOXY MODIFIER 7 from Resolution Performance Products), alkyl $C_{12}$-$C_{14}$ glycidyl ether (for example, HELOXY MODIFIER 8 from Momentive Specialty Chemicals), butyl glycidyl ether (for example, HELOXY MODIFIER 61 from), cresyl glycidyl ether (for example, HELOXY MODIFIER 62), p-tert-butylphenyl glycidyl ether (for example, HELOXY MODIFIER 65), polyfunctional glycidyl ethers such as diglycidyl ether of 1,4-butanediol (for example, HELOXY MODIFIER 67), diglycidyl ether of neopentyl glycol (for example, HELOXY MODIFIER 68), diglycidyl ether of cyclohexanedimethanol (for example, HELOXY MODIFIER 107), trimethylol ethane triglycidyl ether (for example, HELOXY MODIFIER 44), trimethylol propane triglycidyl ether (for example, HELOXY 48), polyglycidyl ether of an aliphatic polyol (for example, HELOXY MODIFIER 84), polyglycol diepoxide (for example, HELOXY MODIFIER 32), bisphenol F epoxides (for example, EPON 862 and Araldite GY-281 from Huntsman Advanced Materials), and 9,9-bis[4-(2,3-epoxypropoxy)-phenylfluorenone (for example, EPON 1079 from Momentive Specialty Chemicals).

Other useful epoxy-containing materials include those that contain cyclohexene oxide groups such as epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methylcyclohexane carboxylate, and bis(3,4-epoxy-6-methylcyclohexylmethyl) adipate. A more detailed list of useful epoxides of this nature is set forth in U.S. Pat. No. 3,117,099 (Proops et al).

Other useful epoxy resins are well known and contain such epoxides as epichlorohydrins, alkylene oxides (for example, propylene oxide), styrene oxide, alkenyl oxides (for example, butadiene oxide), and glycidyl esters (for example, ethyl glycidate). Still other useful epoxy resins include epoxy-functional silicones such as those described in U.S. Pat. No. 4,279,717 (Eckberg et al.), which are commercially available from the General Electric Company. These epoxy resins are polydimethylsiloxanes in which 1 to 20 mole percent of the silicon atoms have been substituted with epoxyalkyl groups (preferably, epoxy cyclohexylethyl, as described in U.S. Pat. No. 5,753,346 (Leir et al.)).

The optional polyenes and epoxy resins are used in amounts less than that of the curable composition. For example, the combined weights of the optional polyene and epoxy resin is less than the weight of the curable composition comprising the dual cure monomer and polythiol.

Generally the stoichiometric molar ratio of thiol groups of the polythiol to ene groups plus the epoxy groups is from 0.75:1 to 1:0.75, inclusive of the dual-cure monomer and any optional polyene and epoxy resin components.

Examples

Summary of Materials

Table 1 provides abbreviations and a source for all materials used in the Examples below:

TABLE 1

| Materials List | | |
|---|---|---|
| Abbreviation | Description | Source |
| AC-51 | Polythioether, $M_n$ ~5062 g/mol with 2.25 functionality | 3M Co., St. Paul, MN |
| Acetone | | VWR International, Radnor, PA |
| Allyl bromide | | Sigma Aldrich, St. Louis, MO |
| $CaCO_3$ | Calcium carbonate, anhydrous | EMD Chemicals, Inc. Gibbstown, NJ |
| CELITE | Diatomaceous earth filter aid, available under the trade name CELITE 545 | EMD Chemicals, Inc. Gibbstown, NJ |
| Cyanuric chloride | | Sigma Aldrich, St. Louis, MO |
| DABCO 33 | 33 wt. % triethylenediamine in propylene glycol, available under the trade name DABCO 33 | Sigma Aldrich, St. Louis, MO |
| Diallylamine | | Sigma Aldrich, St. Louis, MO |
| $CH_2Cl_2$ | Dichloromethane | EMD Millipore Corp., Billerica, MA |
| DMPO | 2,2-Dimethoxy-2-phenylacetophenone | Acros Organics, Geel, Belgium |
| DMSO | Dimethylsulfoxide | EMD Millipore Corp., Billerica, MA |
| DVE | Triethyleneglycol divinylether | BASF Chemical Co., Ludwigshafen, Germany |
| Epichlorohydrin | | Alfa Aesar, Heysham, England |
| EtOAc | Ethyl acetate | VWR International, Radnor, PA |

TABLE 1-continued

Materials List

| Abbreviation | Description | Source |
|---|---|---|
| Glycerol α,α'-diallyl ether | | TCI Co., Tokyo, Japan |
| Glycidol | | Sigma Aldrich, St. Louis, MO |
| $MgSO_4$ | Magnesium sulfate | EMD Chemicals, Inc. Gibbstown, NJ |
| Pentaerythritol | | Alfa Aesar, Heysham, England |
| $K_2CO_3$ | Potassium carbonate | VWR International, Radnor, PA |
| Silica gel | Silica gel, 230-400 mesh | Alfa Aesar, Ward Hill, MA |
| NaOH | Sodium hydroxide, 1N volumetric standard | from Avantor Performance Materials, Inc., Center Valley, PA |
| TAC | Triallyl cyanurate (SR507 A) | Sartomer, Warrington, PA |
| Tetrabutylammonium bromide | | Alfa Aesar, Heysham, England |
| TMPTMP | Trimethylolpropane tris(3-mercaptopropionate) | TCI Co., Tokyo, Japan |
| $CDCl_3$ | Deuterated chloroform | Cambridge Isotope Laboratories, Inc., Andover, MA |

Examples

Preparatory Example 1 (PE-1): Dual-Cure Monomer 1

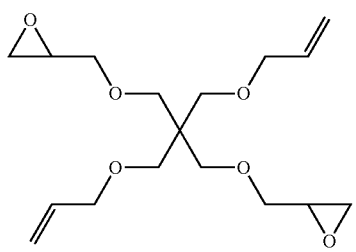

Dual-cure monomer 1

Pentaerythritol [13.61 grams (g), 100 millimole (mmol)] was dissolved in an aqueous solution of NaOH (8.80 g, 220 mmol), and allyl bromide (26.6 g, 220 mmol) was added dropwise via addition funnel. The resultant solution was allowed to stir overnight. The solution was then extracted with EtOAc three times. The combined organic layers were washed with a saturated aqueous sodium chloride solution, dried over $MgSO_4$, filtered, and concentrated to a pale yellow oil. $^1H$ NMR ($CDCl_3$) suggested that this was mainly diallylated material, possibly with small amounts of mono-allylated material.

To a mixture of diallylated pentaerythritol (4.54 g, 21.0 mmol) and epichlorohydrin (19.43 g, 210 mmol) was added NaOH (5.04 g, 126 mmol) and tetrabutylammonium bromide (0.68 g, 2.10 mmol). The resultant mixture was heated at approximately 70° C. for 2 hours. Water was then added and the mixture was extracted with EtOAc three times. The combined organic layers were washed with a saturated aqueous sodium chloride solution, dried over $MgSO_4$, filtered, and concentrated to a yellow oil. $^1H$ NMR analysis of this material suggested that two diastereomeric forms of the desired product were present. Purification via suction filter chromatography (silica gel, ramp eluent from 19/1 to 3/1 hexane/EtOAc) allowed the two diastereomers of the desired product to be separated. The first fraction afforded 2.08 g of a single diastereomer, and the second fraction afforded 1.57 g of the other diastereomer. Overall, 3.65 g of the desired product was collected (53% yield).

Preparatory Example 2 (PE-2): Dual-Cure Monomer 2

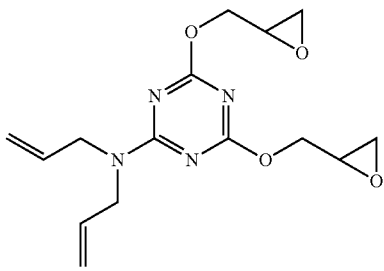

Dual-cure monomer 2

A mixture of cyanuric chloride (3.69 g, 20.0 mmol) and potassium carbonate (2.76 g, 20.0 mmol) in acetone [30 milliliter (mL)] was cooled in an ice bath. A solution of diallylamine (1.94 g, 20.0 mmol) in acetone (30 mL) was then added dropwise via addition funnel over 30 minutes. After stirring for 3 hours, the reaction mixture was filtered through CELITE to remove salts, washing with additional acetone. The filtrate was concentrated to afford 4.74 g of the amino-substituted dichlorocyanurate product as a clear yellow oil. To a solution of the dichlorocyanurate and glycidol (5.73 g, 77.3 mmol) in acetone (50 mL) was added potassium carbonate (10.69 g, 77.3 mmol). The resultant mixture was heated to gentle reflux with a heating mantle overnight. Water was then added (300 mL) and the mixture was extracted with EtOAc three times. The combined organic layers were washed with H$_2$O and saturated aqueous NaCl, then dried over MgSO$_4$, filtered, and concentrated to a pale yellow oil. Purification via suction filter column (silica gel, ramp eluent from 4/1 to 2/1 hexane/EtOAc) afforded 2.85 g of the desired product as a clear, essentially colorless oil which solidifies to a white crystalline solid at room temperature (45% yield from cyanuric chloride).

Preparatory Example 3 (PE-3): Dual-Cure Monomer 3

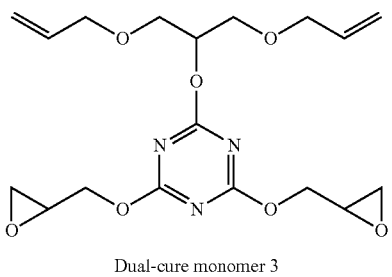 [SMILES: C=CCOCC(COCC=C)Oc1nc(OCC2CO2)nc(OCC2CO2)n1]

Dual-cure monomer 3

To a solution of glycerol, α,α'-diallyl ether (5.68 g, 33.0 mmol) and tetrabutylammonium bromide (1.06 g, 3.30 mmol) in dichloromethane was added aqueous NaOH (150 mL of a 1.0 M solution). The resultant biphasic mixture was cooled in an ice bath, and a solution of cyanuric chloride (5.53 g, 30.0 mmol) in dichloromethane was added dropwise via addition funnel over 30 minutes. After 4 hours, the organic layer was washed with water and a saturated aqueous sodium chloride solution, dried over MgSO$_4$, then filtered and concentrated to a pale yellow oil. This material was purified via suction filter chromatography (silica gel, 9/1 hexane/acetone eluent) to afford 2.50 g of the alkoxy-substituted dichlorocyanurate as a clear, colorless oil. The dichlorocyanurate and glycidol (2.31 g, 31.2 mmol) were dissolved in acetone (100 mL), and potassium carbonate (4.31 g, 31.2 mmol) was added. The resultant mixture was heated at reflux overnight. The salts were removed via filtration, and the filtrate was concentrated under reduced pressure. The residue was dissolved in EtOAc and successively washed with H$_2$O and saturated aqueous NaCl. The organic layer was dried over MgSO$_4$, filtered, and concentrated to afford 2.72 g of the desired product as a clear colorless oil (23% yield from cyanuric chloride). This material was used without further purification.

Formulation Preparation and Curing Experiments

Example 1 (E-1)

In a 50 mL round-bottom flask, 3.353 g of TAC was added to 4.080 g DVE and mixed by means of a magnetic stir bar at 21° C. until homogeneous. The DVE/TAC mixture, AC-51, and DMPO components were added to a 10 mL DAC cup (FlackTek, Inc., Landrum, SC) and speedmixed (using a DAC 150.1 FVZ-K speedmixer from FlackTek, Inc., Landrum, S.C.) for 2 minutes at 3000 rpm (according to Table 2). The resultant mixture was allowed to sit overnight to ensure complete dissolution of the DMPO. The following morning, 1.2 g CaCO$_3$ was added, and the mixture was speedmixed for 1 minute at 1500 rpm. The DABCO33 (0.400 g) was then added, and the mixture was manually mixed for approximately 1 minute. After 24 hours, no curing was observed without irradiation (Table 3)

TABLE 2

Formulations for Examples 1-4

| Example | Ene component | Ene component mass (g) | AC-51 (g) | DMPO (g) | DABCO 33 (g) | CaCO$_3$ (g) |
|---|---|---|---|---|---|---|
| E-1 | DVE/TAC | 0.126 | 3.000 | 0.074 | 0.400 | 1.200 |
| E-2 | Dual-cure monomer 1 | 0.222 | 3.000 | 0.074 | 0.400 | 1.200 |
| E-3 | Dual-cure monomer 2 | 0.216 | 3.000 | 0.074 | 0.400 | 1.200 |
| E-4 | Dual-cure monomer 3 | 0.267 | 3.000 | 0.074 | 0.400 | 1.200 |

Example 2 (E-2)

A similar procedure to E-1 was followed, except that the dual-cure monomer 1 was used in place of the DVE/TAC mixture. Reagent amounts for the E-2 formulation can be found in Table 2. Open time (i.e., the application life of the material or the time when the material can be evenly spread on a surface and completely wet said surface), was observed to be approximately 30 minutes, based on manipulation of the material with a small wooden dowel.

Example 3 (E-3)

A similar procedure to E-1 was followed, except that the dual-cure monomer 2 was used in place of the DVE/TAC mixture. Reagent amounts for the E-3 formulation can be found in Table 2. Also, due to low solubility, 3 drops of DMSO were added to the dual-cure monomer+AC-51+DMPO resin to ensure complete dissolution of dual-cure monomer 2. Open time was observed to be approximately 30 minutes, based on manipulation of the material with a small wooden dowel.

Example 4 (E-4)

A similar procedure to E-1 was followed, except that the dual-cure monomer 3 was used in place of the DVE/TAC mixture. Reagent amounts for the E-4 formulation can be found in Table 2. pen time was observed to be approximately 30 minutes, based on manipulation of the material with a small wooden dowel.

For Examples 1-4, three beads (each approximately 0.2 g) of material were removed from the DAC cup within 5 min of the formulation preparation, and each was separately irradiated at a distance of approximately 2 centimeters (cm) with an LX-400 LED lamp at either 400 nanometers (nm), 385 nm, or 365 nm. Irradiation time necessary for full cure of the material was noted, as recorded in Table 3.

TABLE 3

Photocuring of Examples 1-4

| Example | Open time | 400 nm cure | 385 nm cure | 365 nm cure |
|---|---|---|---|---|
| 1 | No cure | 40 sec | 10 sec | 5 sec |
| 2 | 30 min | 60 sec | 10 sec | 5 sec |
| 3 | 30 min | 60 sec | 10 sec | 5 sec |
| 4 | 30 min | 40 sec | 10 sec | 5 sec |

The results in Table 3 demonstrate that Examples 2-4, which each contain one of the novel dual-cure monomers, exhibit essentially equivalent capacity for photocuring to that of control Formulation 1, which contains a DVE/TAC ene monomer mixture. In addition, Formulations 2-4 also exhibit thiol-epoxy polymerization, which takes place in the absence of any irradiation.

Example 5 (E-5)

In a 50 mL round-bottom flask, 3.353 g of TAC was added to 4.080 g DVE and mixed by means of a magnetic stir bar at 21° C. until homogeneous. The DVE/TAC mixture, TMPTMP, and DMPO components were added to a 10 mL DAC cup (FlackTek, Inc., Landrum, S.C.) and speedmixed (using a DAC 150.1 FVZ-K speedmixer from FlackTek, Inc., Landrum, S.C.) for 2 minutes at 3000 rpm (according to Table 4). The resultant mixture was allowed to sit overnight to ensure complete dissolution of the DMPO. The following morning, 0.800 g $CaCO_3$ was added, and the mixture was speedmixed for 1 minute at 1500 rpm. The DABCO33 (0.060 g) was then added, and the mixture was manually mixed for approximately 1 minute. After 24 hours, no curing was observed without irradiation (Table 5).

TABLE 4

Formulations for Examples 5-8

| Example | Ene component | Ene component mass (g) | TMPTMP (g) | DMPO (g) | DABCO33 (g) | $CaCO_3$ (g) |
|---|---|---|---|---|---|---|
| E-5 | DVE/TAC | 0.704 | 1.000 | 0.040 | 0.060 | 0.800 |
| E-6 | Dual-cure monomer 1 | 1.240 | 1.000 | 0.050 | 0.080 | 0.800 |
| E-7 | Dual-cure monomer 2 | 1.210 | 1.000 | 0.050 | 0.080 | 0.800 |
| E-8 | Dual-cure monomer 3 | 1.490 | 1.000 | 0.050 | 0.080 | 0.800 |

Example 6 (E-6)

A similar procedure to E-5 was followed, except that the dual-cure monomer 1 was used in place of the DVE/TAC mixture. Reagent amounts for the E-6 formulation can be found in Table 4. Open time was observed to be approximately 30 minutes, based on manipulation of the material with a small wooden dowel.

Example 7 (E-7)

A similar procedure to E-5 was followed, except that the dual-cure monomer 2 was used in place of the DVE/TAC mixture. Reagent amounts for the E-7 formulation can be found in Table 4. Also, due to low solubility, 2 drops of DMSO were added to the dual-cure monomer+TMPTMP+DMPO resin to ensure complete dissolution of dual-cure monomer 2. Open time was observed to be approximately 30 minutes, based on manipulation of the material with a small wooden dowel.

Example 8 (E-8)

A similar procedure to E-5 was followed, except that the dual-cure monomer 3 was used in place of the DVE/TAC mixture. Reagent amounts for the E-8 formulation can be found in Table 4. Open time was observed to be approximately 30 minutes, based on manipulation of the material with a small wooden dowel.

For Examples 5-8, three beads (each approximately 0.2 g) of material were removed from the DAC cup within 5 minutes of the formulation preparation, and each was separately irradiated at a distance of approximately 2 cm with an LX-400 LED lamp at either 400 nm, 385 nm, or 365 nm. Irradiation time necessary for full cure of the material was noted, as recorded in Table 5.

TABLE 5

Photocuring of Examples 5-8

| Example | Open time | 400 nm cure | 385 nm cure | 365 nm cure |
|---|---|---|---|---|
| 5 | No cure | 40 sec | 10 sec | 5 sec |
| 6 | 30 min | 60 sec | 10 sec | 5 sec |
| 7 | 30 min | 60 sec | 10 sec | 5 sec |
| 8 | 30 min | 40 sec | 10 sec | 5 sec |

The results in Table 5 demonstrate that Examples 6-8, which each contain one of the novel dual-cure monomers, exhibit essentially equivalent capacity for photocuring to control Example 5 which contains a DVE/TAC ene monomer mixture. In addition, Examples 6-8 also exhibit thiol-epoxy polymerization, which takes place in the absence of any irradiation.

What is claimed is:

1. A curable composition comprising:
   a) a dual cure monomer of the formula:

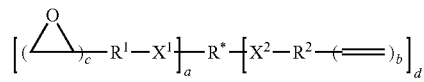

wherein

R* is a cyclic or acyclic aliphatic group or a cyclic heteroaromatic group;

$X^1$ is —O—, —S—, —NR$^3$—, —NR$^3$—CO—NR$^3$, —CO—NR$^3$— or NR$^3$—CO—, where R$^3$ is H, $C_1$-$C_4$ alkyl or R$^1$-Epoxy;

$R^1$ is a (hetero)hydrocarbyl group;

$X^2$ is —O—, —S—, —NR$^4$—, —NR$^4$—CO—NR$^4$—, —CO—NR$^4$—, —NR$^4$—CO — where R$^4$ is H, $C_1$-$C_4$ alkyl or $R^2$—CH=CH2;

$R^2$ is a (hetero)hydrocarbyl group;

each of subscripts a,b, and c and d are at least one, with the proviso that the monomer has at least two epoxy groups and at least two ene groups; and b) a polythiol.

2. The composition of claim 1 wherein R* is the residue of a polyol.

3. The composition of claim 1 wherein R$^1$ and R$^2$ is an alkylene.

4. The composition of claim 1 wherein R* is the residue of an isocyanurate.

5. The composition of claim 1 wherein the polythiol is of the formula:

where R$^{30}$ is (hetero)hydrocarbyl group having a valence of y, and y is ≥2.

6. The composition of claim 5 where R$^{30}$ is an aliphatic or aromatic group, optionally containing one or more functional groups consisting of esters, amides, ethers, urethane, thioethers, and urea functional groups, and y is ≥2.

7. The composition of claim 5 where R$^{30}$ is an aliphatic, cycloaliphatic, aromatic or alkyl-substituted aromatic moiety having from 1 to 30 carbon atoms and optionally 1 to 4 catenary heteroatoms of oxygen, nitrogen or sulfur.

8. The composition of claim 5 wherein said polythiol is obtained by esterification of a polyol with a terminally thiol-substituted carboxylic acid.

9. The composition of claim 1, wherein the dual-cure monomer is of the formula:

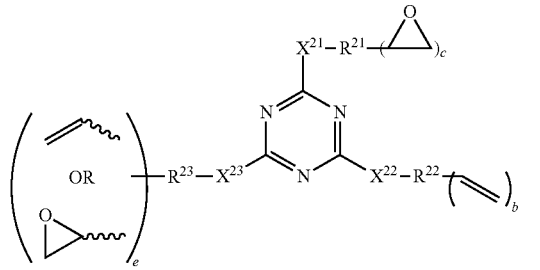

wherein

R$^{21}$ is a (hetero)hydrocarbyl group;

R$^{22}$ is a (hetero)hydrocarbyl group;

R$^{23}$ is a (hetero)hydrocarbyl group;

X$^{21}$, X$^{22}$ and X$^{23}$ are each independently S—, —O — or NR$^{13}$—, where R$^{13}$ is H, $C_1$-$C_4$ subscripts b and c and e are at least one.

10. The composition of claim 1, further comprising an epoxy resin.

11. The composition of claim 1, further comprising a polyene.

12. The composition of claim 1, wherein the stoichiometric molar ratio of thiol groups of the polythiol to ene groups plus the epoxy groups is from 0.75:1 to 1:0.75.

13. A dual-cure monomer of the formula:

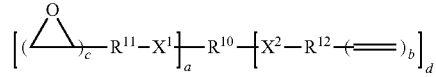

wherein

R$^{10}$ is a cyclic or acyclic aliphatic group or a cyclic heteroaromatic group;

R$^{11}$ is a divalent (hetero)hydrocarbyl group;

R$^{12}$ is a divalent (hetero)hydrocarbyl group;

X$^1$ and X$^2$ are each independently is —O—, —S—, —NR$^3$—, —NR$^3$—CO—NR$^3$, —CO—NR$^3$— or NR$^3$—CO—, where R$^3$ is H, $C_1$-$C_4$ alkyl subscripts a, b, c and d are at least one, with the proviso that the monomer has at least two epoxy groups and at least two ene groups.

14. The dual-cure monomer of claim 13 wherein R$^{10}$ is an alkylene having 2-10 carbon atoms.

15. The dual-cure monomer of claim 13 wherein R$^{11}$ and R$^{12}$ are divalent hydrocarbyl groups.

16. A dual-cure monomer of the formula:

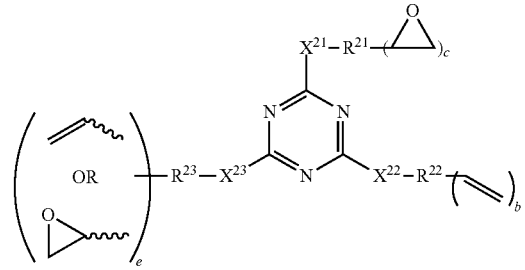

wherein

R$^{21}$ is a (hetero)hydrocarbyl group;

R$^{22}$ is a (hetero)hydrocarbyl group;

R$^{23}$ is a (hetero)hydrocarbyl group;

X$^{21}$, X$^{22}$ and X$^{23}$ are each independently OH or —NR$^{13}$H, where R$^{13}$ is H, $C_1$-$C_4$ subscripts b and c and e are at least one, with the proviso that the monomer has at least two epoxy groups and at least two ene groups.

17. The composition of claim 1, further comprising a photoinitiator and a base catalyst.

* * * * *